United States Patent Office 3,435,333
Patented Mar. 25, 1969

3,435,333
NUCLEAR RESONANCE SPECTROGRAPH
Lienhard Wegmann, Wallisellen, and Mario Gallo, Zurich, Switzerland, assignors to Spectrospin A.G., Zurich, Switzerland
Filed Aug. 4, 1965, Ser. No. 477,108
Int. Cl. G01n 27/78
U.S. Cl. 324—.5      3 Claims

ABSTRACT OF THE DISCLOSURE

A nuclear magnetic resonance spectograph, which works simultaneously with two different frequencies transmitted into a specimen, a field stabilization frequency and a signal frequency, both generated by multiplication of one basic frequency by different multiples and separated one from the other by a frequency selector within the receiver. The invention relates further to a method to produce a variable signal frequency and a calibrating device for this signal frequency.

---

The invention relates to a high resolution nuclear resonance spectograph, making possible the recording of nuclear resonance stabilized, high resolution nuclear resonance spectra of the same atomic nucleus at different frequencies.

The stabilization of the nuclear resonance has been shown to be essential for nuclear resonance spectra, because this is the only method for carrying out the quick and reliable calibration of the resonance lines with complex nuclear resonance spectra. Hitherto known nuclear resonance stabilizers all operated on a single frequency which corresponded to the resonance frequency of the nucleus to be investigated at the field strength determined by the magnet. This is understandable, since the magnets hitherto used for high resolution nuclear resonance usually provided the required field homogeneity only at a certain field strength, even in the case of electromagnets and with the use of field correction. However, now magnets are known which make possible high resolution nuclear magnetic resonance at different field strength, since the range, where the magnetic field has the necessary homogeneity or this can be achieved by field correcting arrangements, is much wider.

High resolution nuclear resonance spectra have usually a large number of resonance lines the formation of which must be attributed to two effects: the chemical shift and the spin-spin splitting. While the chemical shift is proportional to the applied magnetic field, the spin-spin split as an effect of the internal magnetic fields is independent of the applied magnetic field.

Two nuclear resonance spectra of the same substance, recorded on the same nucleus, may therefore differ substantially, if they are recorded at a different external magnetic field $B_0$, or according to the resonance relation $\omega_0 = \gamma_K \cdot B_0$ at different basic frequencies $\omega_0$. ($\gamma_K$ is the gyromagnetic factor of the atomic nuclide or nuclear species K). Two such spectra contain therefore correspondingly more information than a single spectrum, and for this reason a comparison spectrum is often recorded in a second apparatus of the same substance on the same nuclide, but with a different magnetic field.

The present invention has the object of enabling such comparison spectra to be recorded with one and the same apparatus.

According to the present invention, a nuclear magnetic resonance spectograph contains an electromagnet qualified for producing a suitable magnetic field at different field strengths, which is prestabilized by the superposition of a field stabilizer and a current stabilizer, a probe head with probe, transmitter and receiver coils, and a high frequency transmission and receiving installation and is characterized in that a transmitter generates a high frequency $f_0$ of high stability, which is integrally multiplied to form a frequency $m.f_0$ ($m$ being a whole number); in that an amplifier generates alternatively different whole multiples $n.m.f_0$ and a signal generator alternatively generates whole multiples $n \cdot (mf_0 + \epsilon)$ and/or $n \cdot (mf_0 - \epsilon)$; that two frequencies $n_1 mf_0$ and $n_i(mf_0 \pm \epsilon)$ are applied simultaneously to the transmission coils in the probe head; that the nuclear resonance signal generated by the probe is received by the receiving coil and applied to the receiver; that the signal is divided into two signals in the receiver by a frequency selector consisting of phase-sensitive detectors with the reference frequencies $n_1 \cdot m \cdot f_0$ and $n_i(mf_0 \pm \epsilon)$, of which two signals that with the frequency $n_i \cdot mf_0$ is applied to the field stabilizer for stabilizing the magnetic field and the signal on the frequency $n_i(mf_0 \pm \epsilon)$ is applied to a recording unit for recording the spectrum, wherein the frequency $\epsilon$ is variable and adjustable and calibrated in part per million of the frequency $mf_0$.

The invention will be further described, by way of example, with reference to the accompanying drawings, in which.

Figure 1:
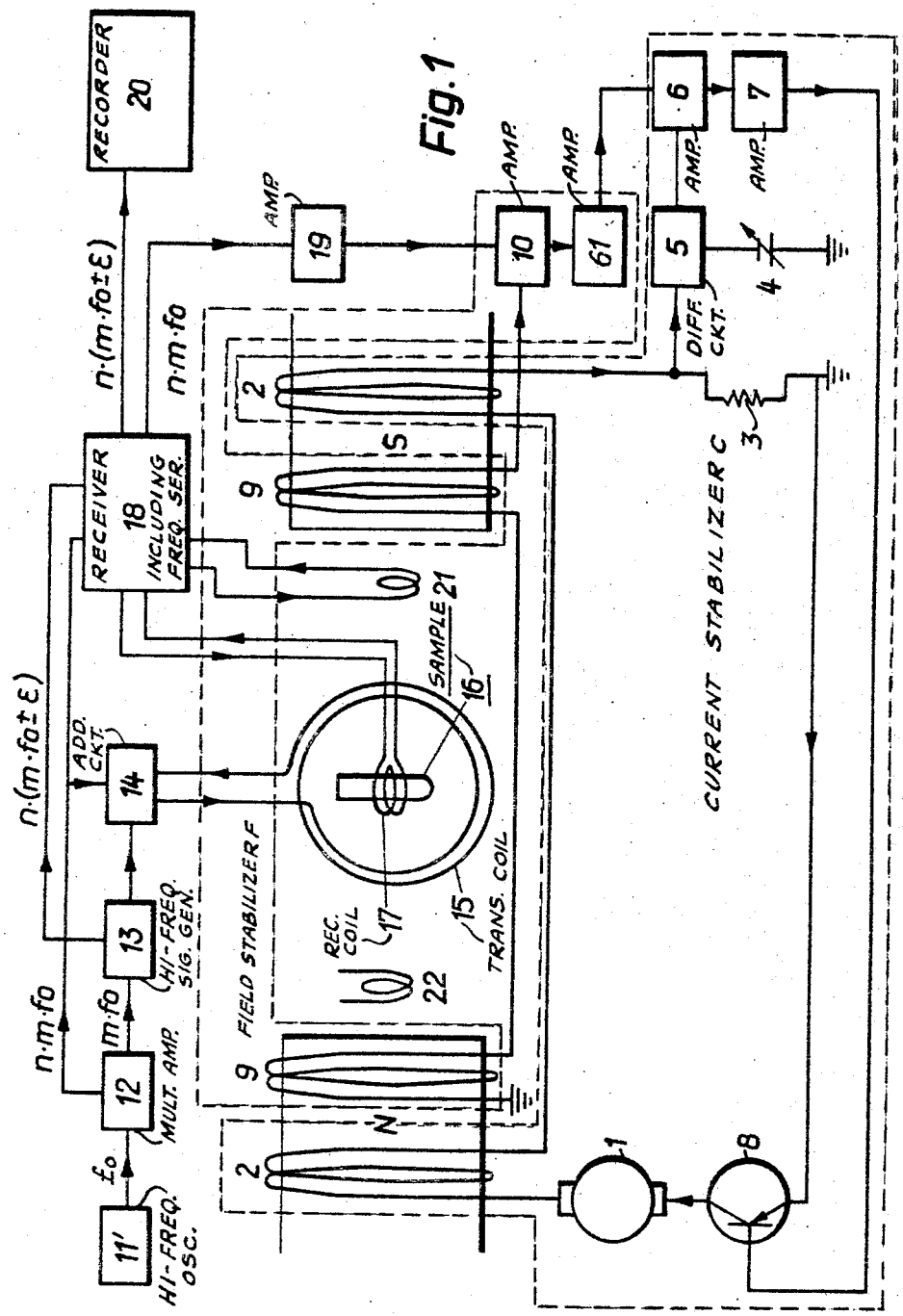
FIG. 1 shows an embodiment of the nuclear induction spectrograph according to the invention.

In the nuclear introduction spectrograph of FIG. 1, a magnet NS is supplied by a prestabilized power pack or a prestabilized generator 1. The current flowing through the field windings 2 of the magnet produces in the reference resistor 3 a voltage drop which is compared with a reference voltage supplied by source 4. A difference circuit 5 applies the difference between these voltages through a low-noise D.C. amplifier 6 and further amplifiers and attenuators 7 to an adjusting element 8 which corrects the current flowing in the generator-magnet circuit in accordance with the received signal. This control circuit including elements 1 to 8 is hereafter called the current stabilizer C. Its elements may be in accordance with the known art; its function is the control of the current in the field coils 2 of the magnet NS within a limit of accuracy of the order of $1:10^5$ to $1:10^7$. The field strength of the magnet may be varied by changing the reference voltage 4.

A second control circuit for stabilizing the magnetic field consists of coils 9 mounted on the pole shoes of the magnet NS, a low-noise D.C. amplifier 10 and further amplifiers and attenuators 11. A change in the field produces in the coils 9 a signal which is proportional to the temporal derivation of the field. This signal is applied in an amplifier 10 with integrating characteristics through the amplifiers and attenuators 11 to the input of the low-noise amplifier 6 in the current stabilizer, where the signal produces a control voltage in the adjusting member 8. This second control stage 9 to 11 is hereafter the field stabilizer F. It may consist of other electronic elements of equivalent function and has the object of forcing a short-duration stability of the field of $10^{-6}$ to $10^{-8}$/sec. The coils 9 may be replaced, e.g., by a hall generator if the temperature constancy of the element is guaranteed. The attenuators in the amplifier 11 may be used for de-energizing the field stabilizer.

The third control stage, namely the nuclear resonance stabilizer, operates through the high-frequency part.

A quartz oscillator 11' produces a high frequency of for instance 5 mc./s. with a very high frequency stability. In an amplifier 12, containing multipliers, amplifiers, switches and attenuators, this frequency is raised to a series of multiples $n \cdot m \cdot f_0$ ($n$ and $m$ being whole numbers equal to or larger than 1). A frequency $m \cdot f_0$ is applied to the signal generator 13 which produces first a high frequency $m \cdot f_0 \pm \epsilon$, whereby $\epsilon$ is small in comparison with $m \cdot f_0$. The signal generator contains also multiplier stages, amplifiers, switches and attenuators producing frequencies $n \cdot (m \cdot f_0 \pm \epsilon)$. In addition, the signal generator contains control circuits for varying the difference $\epsilon$ within certain limits. The amplifier 12 and the signal generator 13 may be so switched that, in addition to the frequency $m \cdot f_0$ transmitted directly from the amplifier 12 to the signal generator 13, at the same time only one frequency out of the sequence of multiples $n_1 \cdot m \cdot f_0$ can be selected. From the amplifier 12, for example, the frequency $n_1 \cdot m \cdot f_0$ reaches via the adding stage 14 the transmission coils 15 in the air gap of the magnet NS. At the same time, the signal generator 13 applies the frequency $n_1 \cdot (mf_0 + \epsilon)$ to the same transmission coil 15. Due to the resonance of the atomic nuclei in the sample 16, a signal is generated in the receiver coil 17 which is first amplified under low-noise conditions in the receiver 18, while direct leakage between transmitter and receiver coils are compensated as known in the art. The receiver 18 also contains beat stages and phase-sensitive detectors. These phase detectors receive, in addition to the received signal, also the reference voltages $n_1 \cdot m \cdot f_0$ and $n_1 (m \cdot f_0 + \epsilon)$ from the amplifier 12 and the signal generator 13. In this way, a frequency separator is formed which separates the signals on the two different frequencies. The invariable signal $n_1 \cdot m \cdot f_0$ is applied via an amplifier and attenuator 19 to the input of the amplifier 10 in the field stabilizer and produces in the current stabilizer a control voltage which is effective in the adjusting member 8. This further control stage which links, from the nuclear coupling in the sample 16 through the receiver 18 and amplifier 19, the field strength of the magnet NS with the extremely stable frequency $f_0$ of the quartz oscillator 11', respectively the frequency $m \cdot f_0$ of the amplifier 12, which is one of the same stability. Its object is the long-duration stabilization of the field, or the short-duration stabilization to better than $10^{-10}/\text{sec}$. The nuclear resonance stabilizer can be de-energized by means of the attenuators in the amplifier 19.

The signal with the frequency $n_1(mf_0 + \epsilon)$ is applied directly from the receiver, equipped with the necessary final stage amplifiers, to the recording unit 20, comprising an oscillograph and/or recorder. The magnetic field is retained by the nuclear resonance stabilizer in accordance with the relation $2\pi n_1 mf_0 = \gamma \cdot B_0$, if one line of the spectrum to be recorded represents the resonance term. This line is regarded as the internal standard because it represents the reference line of the spectrum to be recorded. According to the resonance term $$2\pi n_1(mf_0 + \epsilon) = \gamma B_0$$

further lines of the spectrum are brought to resonance if the difference $n_1 \cdot \epsilon$ corresponds to the interval between one line and the reference line, measured in c./s. at a field strength $B_0$. By varying $\epsilon$ the whole spectrum may be recorded under nuclear stabilized conditions, namely by switching $+\epsilon$ and $-\epsilon$ towards higher and lower frequencies from the reference line.

If the transmitter 12 and the signal generator 13 are switched to frequencies $n_2 m \cdot f_0$, and $n_2(m \cdot f_0 \pm \epsilon)$, respectively, after for instance raising the field for producing the new resonance condition at a higher frequency the same sample may be investigated, possibly requiring a change of the probe head, containing the transmission coils 15 and the receiving coil 17. This will be explained with reference to a proton resonance spectrum. The frequency $f_0$ is assumed to be 5 mc./s., $m$ is 6, i.e., $mf_0 = 30$ mc./s. With $n = 1, 2, 3$, the spectrum may be recorded at 30, 60 and 90 mc./s., the corresponding resonance field strength being about 7.1; 14.2 and 21.3 kilogauss.

Nuclear resonance spectra are usually measured in such a way that the difference between a line and the reference line is given in parts per million (p.p.m.). Thus with a frequency advance, the indication is given as $$\frac{f' - f}{f} \cdot 10^6$$

with a field advance as $$\frac{B_0' - B_0}{B_0} \cdot 10^6$$

This indication in p.p.m. has the advantage that the chemical shift can be represented independently of the field or frequency.

In the nuclear resonance spectrograph according to the invention, the frequency advance is produced by changing the frequency difference $\epsilon$. If $\epsilon$ is calibrated in p.p.m. of $mf_0$, this calibration will be correct for any proton-stabilized frequency, because also $\epsilon$ is multiplied by $n$.

Further pairs of coils are fitted in the field of the nuclear induction spectograph, for example, modulating coils 21 for the known recording according to the side band modulation method and shin coils 22 for homogenizing the field.

Figure 2:
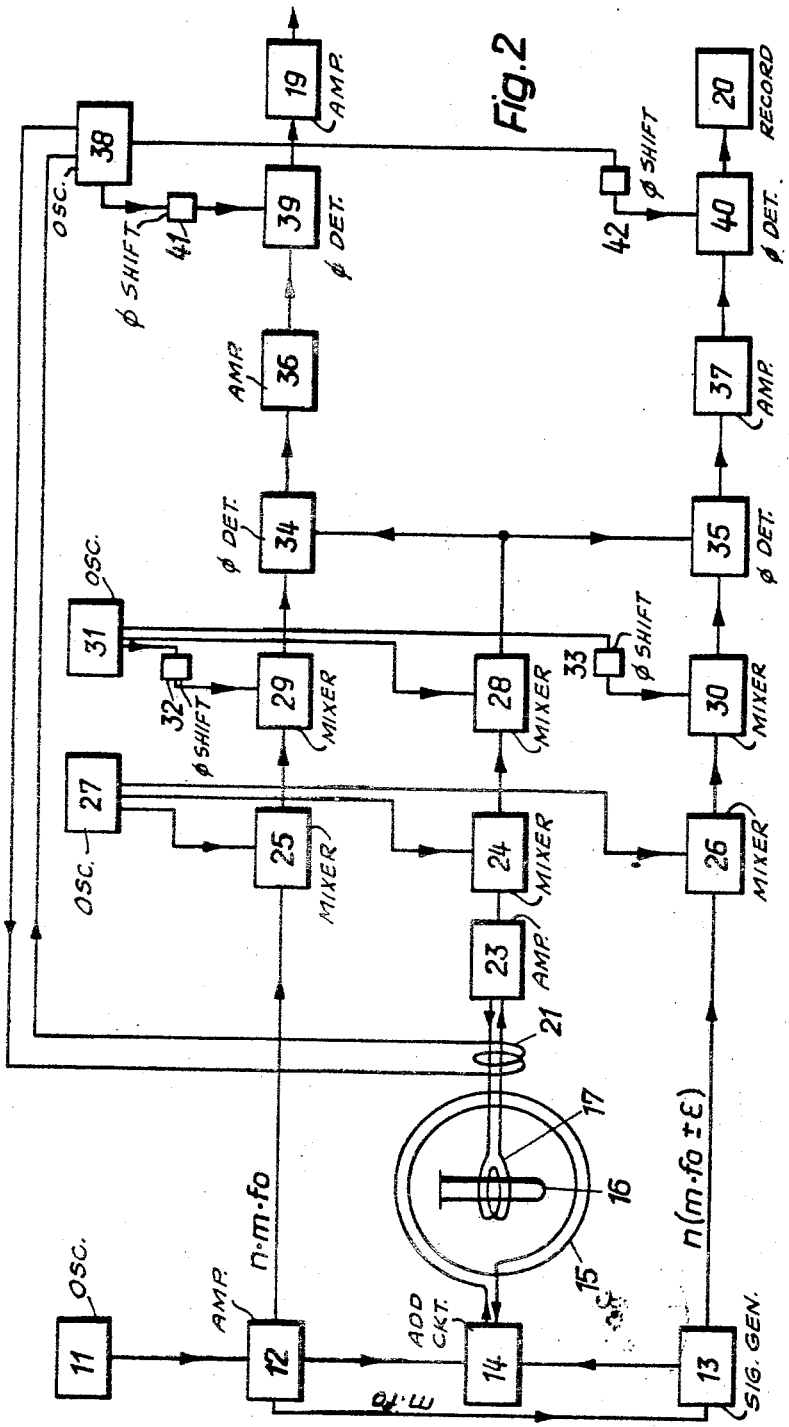
FIG. 2 shows, in greater detail, a block diagram of the transmission and receiving installation.

FIG. 2 shows a more detailed block diagram of the transmission and receiving installation. The transmitters and amplifiers 11 to 14, the sample 16 and the transmission and receiving coils 15 and 17 are employed as before. The nuclear resonance signals coming from the receiver coil and having the frequencies $n \cdot m \cdot f_0$ and $n(m \cdot f_0 \pm \epsilon)$ are first amplified together in a low-noise cascade amplifier 23. Then the signal and the two reference voltages from 12 and 13 are brought in three mixing stages 24, 25, 26 with the frequency of a local oscillator 27 to a first intermediate frequency. Three further mixing stages 28, 29, 30 operating with the frequency of a second local oscillator 31 brings the signal and reference voltages to a second intermediate frequency while phase shifters 32, 33 enable the phases of the reference voltages to be adjusted in order to obtain in phase detectors 34, 35 either the absorption mode or the dispersion mode. The phase detector 34 operates on the intermediate frequency produced from the frequency $n.mf_0$, while the phase detector 35 operates on a slightly different intermediate frequency from $n(m \cdot f_0 \pm \epsilon)$ so that at this point the signal from the mixing stage 28 is split into its two frequency components. By means of a low frequency local oscillator 38 which supplies the field modulation coils 21, the input signal is also frequency modulated, and the modulation side bands formed thereby at the outputs of the phase detectors, 34, 35, whose frequency is equal to the modulation frequency, are amplified in selective amplifiers 36, 37 before they are rectified in the phase detectors, 39, 40. These phase detectors receive the reference voltages through phase shifters 41, 42 on the low frequency local oscillator 38. The D.C. signal from the channel 34, 36, 39, representing the signal on the frequency $n.m.f_0$ is now applied to the amplifier 19 and reaches thereby the field stabilizer. This signal is adjusted by means of the phase shifter 32 to dispersion mode. The signal from the channel 35, 37, 40 passes to the recording unit 20 and may be recorded according to the adjustment of the phase shifter 33 in absorption or dispersion mode.

The units 36 to 42 realize with the field modulation coils 21 the known side-band modulation method.

The embodiment is therefore characterized by the fact that the receiver of the nuclear resonance spectograph according to the invention operates according to the side band modulation method.

The nuclear resonance stabilization may be used for all nuclei but is applied preferably to proton spectra because these have the narrowest lines and the smallest chemical shifts so that here, good stabilization and accurate calibration are decisive. The range which can be covered with proton stabilization must therefore be adapted to the range of the extent of proton spectra. Known proton stabilizers are satisfied usually with 10 to 12 p.p.m. although many proton spectra extend over 15 p.p.m. and more. In addition, known constructions may usually be used only towards one side of the reference line.

This restriction is accepted in view of the technical difficulties incurred in producing a highly constant but variable frequency difference $\epsilon$ with very linear characteristic.

Figure 3:
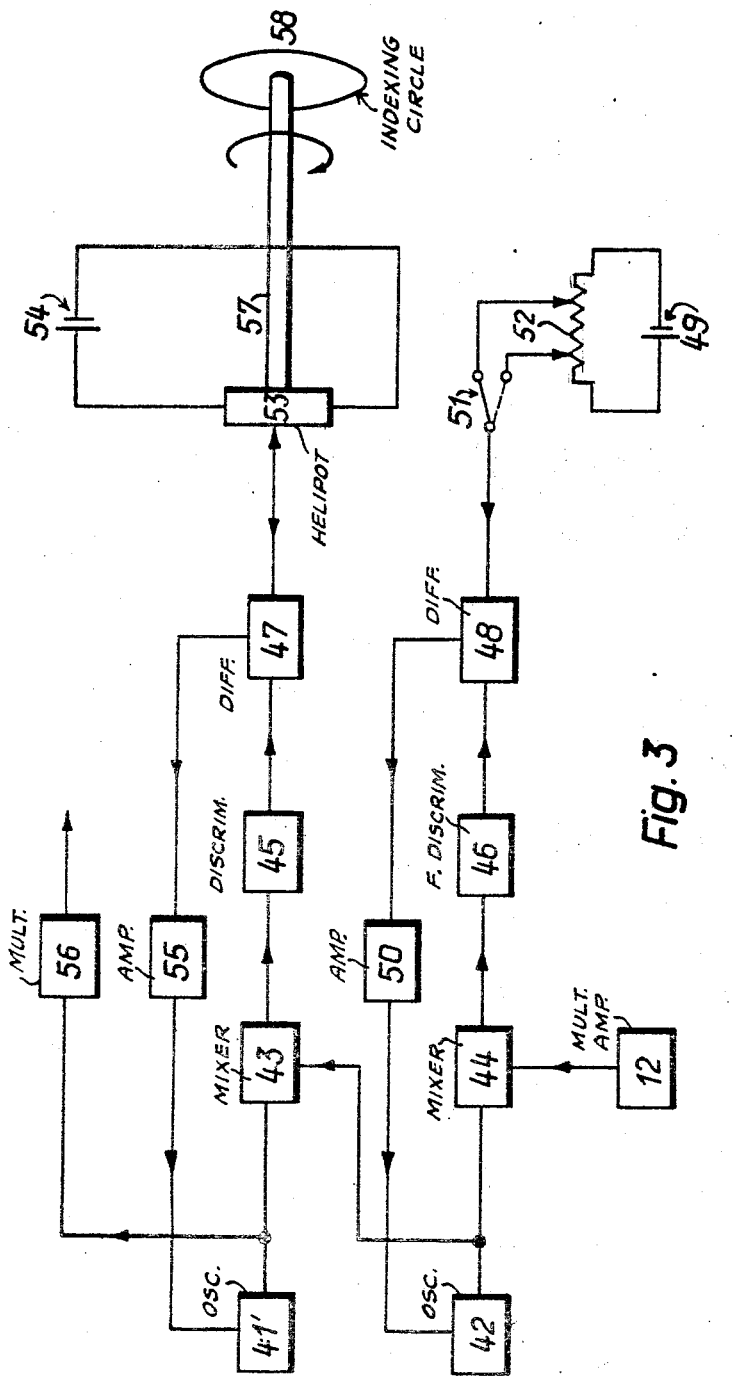
FIG. 3 is a block diagram of the signal generator.

FIG. 3 shows an embodiment of a signal generator 13 making it possible to use a range of 15 p.p.m. towards both sides of the reference line. Two freely oscillating quartz oscillators 41′, 42′ the frequency of which can be shifted within a certain range, produce each a frequency of about $m.f_0$. In the first circuit the frequency of the oscillator 42′ is compared in a mixing stage 44 with the exact frequency $m.f_0$ from the multiplier 12. A frequency discriminator 46 operating with impulses of equal height and width transforms the frequency difference into a D.C. voltage which is compared with reference voltage 49 in a passive differentiating stage 48. The voltage difference is used through D.C. amplifier 50 for controlling the frequency of the oscillator 42′. By suitably choosing the reference voltage 49, it is therefore possible to stabilize the frequency of the oscillator 42′ by a random, not too excessive, amount $f_1$ from the control frequency $m.f_0$. The switch 51 permits the choice of two different reference voltages by taps 52, wherein the taps may be so adjusted that the difference $f_1$ is 30 p.p.m. of $m.f_0$ and the difference $f_1'$ 15 p.p.m. A second circuit compares the frequency of the oscillator 41′ with the now controlled frequency $m.f_0+f_1$ or $m.f_0+f_1'$ of the oscillator 42′ in a mixer 43.

Figure 4:
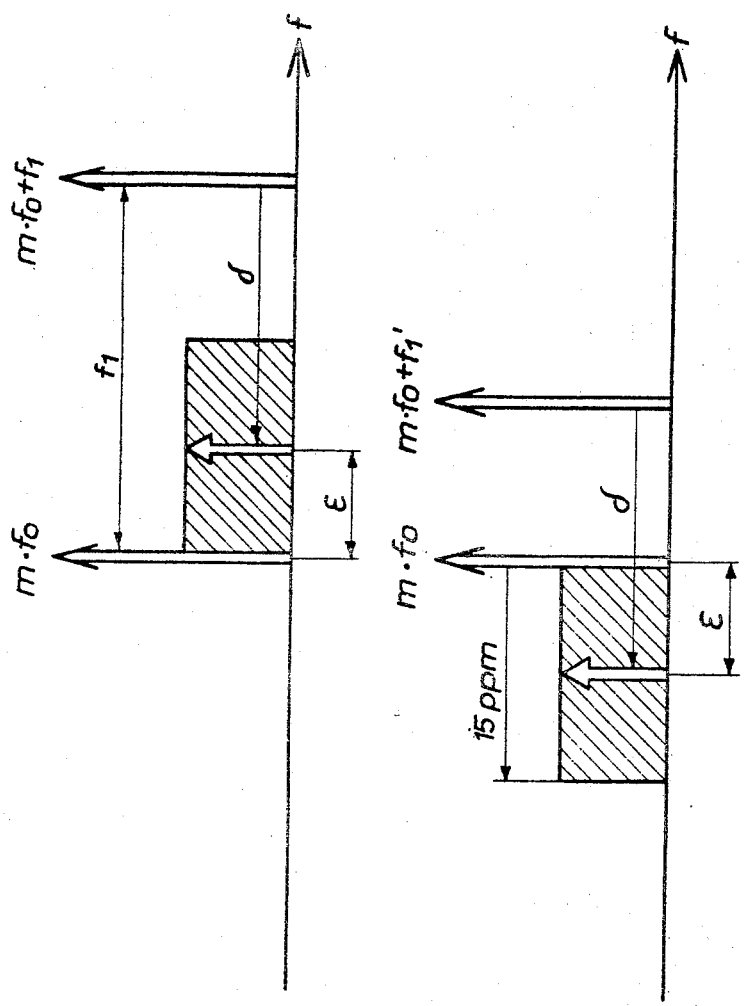
FIG. 4 is an explanatory diagram of the frequency regions produced by the signal generator.

The frequency discriminator 45 and the differentiating stage 47 compare this difference $\delta$ with a variable reference voltage taken from a voltage source on a motor or hand driven helipot 53. The differential voltage is used through a D.C. amplifier 55 for controlling the frequency of the oscillator 41′. The oscillator is therefore forced into a frequency $m.f_0+f_1+\delta$ or $m.f_0+f_1'+\delta$ wherein $\delta$ varies with the position of the helipot 53. The reference voltage on the helipot 53 is now so selected that $\delta$ is variable between $-15$ p.p.m. and $-30$ p.p.m. from $mf_0$. In consequence, $m.f_0+f_1+\delta=m.f_0+\epsilon$ where $\epsilon$ is variable from 0 to 15 p.p.m. and $mf_0+f_1'+\delta=mf_0-\epsilon$ where $\epsilon$ is variable in the same range of 15 p.p.m. These frequency conditions are shown in FIG. 4. The output of the second circuit applies the frequency $nf_0\pm\epsilon$ to a frequency multiplier 56 which produces the frequencies $m.(mf_0\pm\epsilon)$ which are later required.

This embodiment is therefore characterized in that for composing the variable frequency $m.f_0\pm\epsilon$, two fixed alternative frequencies $m.f_0+f_1$ and $m.f_0+f_1'$ and a further variable frequency are produced, the latter being below the two fixed frequencies by the variable amount $\delta$, whereby each frequency is produced by shiftable quartz oscillators and controlled by frequency discriminators and reference voltages and the fixed frequencies are added to the frequency $mf_0$ and variable frequency to the fixed frequencies, and their range of variation $\delta$ of the variable frequency and the frequencies $mf_0+f_1$ and $mf_0+f_1'$ are so selected that $f_1-\delta=+\epsilon$ and $f_1'-\delta=-\epsilon$.

FIG. 3 shows also an embodiment wherein the reference helipot 53 for the variable frequency $mf_0\pm\epsilon$ is mounted on a common axis with an indexing circle 58 divided in parts per million. The choice of a highly linear helipot 53 and a correspondingly linear frequency discriminator 45 makes it possible to divide the indexing circuit 58 linearly and gives the spectrum calibrating scale in p.p.m., either for direct reading or as signal transmitter. This applies in that case not only to spectra recorded on the frequency $m.f_0$ but also to all spectra and recording frequencies $n.m.f_0$ since the advance frequency $\pm$ is also multiplied by $n$ in the multiplier 56.

This embodiment is characterized in that the variable reference voltage for producing the variable frequency $mf_0\pm\epsilon$ is produced by a helipot having on its axis an indexing circle calibrated in p.p.m., wherein this calibration is valid for all nuclear resonance stabilized frequencies $n.mf_0$.

Instead of a multiplication of a frequency $f_0$ to the frequency $m.f_0$ the nuclear resonance spectrograph according to the invention may contain an oscillator which produces directly a frequency $f^+ = m.f_0$. The case $m=1$ is not excluded according to the invention. However it may be advantageous to select a bigger value of $m$, because frequencies of several mc./s. are more easily directly stabilized than higher frequencies and because during the operation of the apparatus without nuclear resonance stabilization spectroscopy is possible also with smaller frequencies than $m.f_0$.

We claim:

1. A nuclear magnetic resonance spectrograph comprising a field stabilizer, a current stabilizer, an electromagnet adapted for producing a magnetic field at selected field strengths, said electromagnet being coupled to and prestabilized by said field stabilizer and said current stabilizer, a sample head for use with a sample, said sample head including a transmitter coil and a receiver coil, a high frequency transmitting and receiving installation including a transmitter and a receiver; an oscillator generating a high frequency $f_0$ of high stability, first means for integrally multiplying said high frequency to form a frequency $m.f_0$ and for generating whole multiples $n.m.f_0$, a signal generator connected to said first means for selectively generating whole multiples $n(m.f_0\pm\epsilon)$, said receiver being coupled to said first means and said signal generator; means coupled to said signal generator for applying selected of the two frequencies $n.m.f_0$ and $n.(m.f_0\pm\epsilon)$ simultaneously to the transmitter coil in said sample head; a nuclear magnetic resonance signal, generated within said sample head by said frequencies applied to said transmitter coil, being picked up by the receiving coil and applied to said receiver, said receiver including a frequency separator, the nuclear magnetic resonance signal being divided into two signals in said receiver by said frequency separator, said separator including phase-sensitive detector means receiving from said first means and said signal generator, said selected frequencies, means for applying the first of said two signals with the selected $n.m.f_0$ frequency to the field stabilizer for stabilizing the magnetic field, a recording unit coupled to said receiver, said receiver transmitting to said recording unit the signal of the selected frequency $n.(m.f_0\pm\epsilon)$ for recording of the spectrum of the sample, the frequency $\epsilon$ being variable and adjustable, the receiver being a side-band modulation operating circuit.

2. A nuclear resonance spectrograph as claimed in claim 1 wherein said signal generator comprises a mixer connected to said first means, a shiftable quartz oscillator also connected to said mixer so that the frequency $m.f_0$ is compared in said mixer with a frequency of $m.f_0+f_1$ generated by said quartz oscillator, a source of a reference voltage, a frequency discriminator connected to said mixer to produce a voltage proportional to the frequency of the output thereof, a comparator connected to said source of reference voltage and to said discriminator so that the difference frequency $f_1$ is compared with said reference voltage and the resulting signal is fed to said quartz oscillator to stabilize the frequency $m.f_0+f_1$, means to vary said reference voltage to permit generating and stabilizing a second frequency $m.f_0+f_1'$ means by which a frequency $-\delta$ is added to the frequencies $m.f_0+f_1$ and $m.f_0+f_1'$ and means whereby the frequencies $f_1, f_1'$ and $\delta$ are adjusted so that $f_1-\delta$ is equal to the frequency $+\epsilon$ and $f_1'-\delta$ is equal to the frequency $-\epsilon$.

3. A nuclear magnetic resonance spectrograph as claimed in claim 1 comprising a helipot controlling the variable frequency $m.f_0 \pm \epsilon$, said helipot including on its axis an indexing circle calibrated in parts per million, said calibration being valid for all nuclear magnetic resonance stabilized frequencies $n.f_0$.

References Cited

UNITED STATES PATENTS

| | | | |
|---|---|---|---|
| 3,034,040 | 5/1962 | Williams | 324—0.5 |
| 3,127,556 | 3/1964 | Gielow | 324—0.5 |
| 3,173,083 | 3/1965 | Anderson | 324—0.5 |
| 3,202,908 | 8/1965 | Anderson | 324—0.5 |
| 3,215,930 | 11/1965 | Turner | 324—0.5 |
| 3,329,890 | 7/1967 | Kingston | 324—0.5 |

RUDOLPH V. ROLINEC, *Primary Examiner.*

MICHAEL J. LYNCH, *Assistant Examiner.*